July 20, 1954  J. M. FREIBERG  2,684,153
SUSPENSION BLOCK FOR PACKING GLASS
Filed Jan. 8, 1952  2 Sheets-Sheet 2
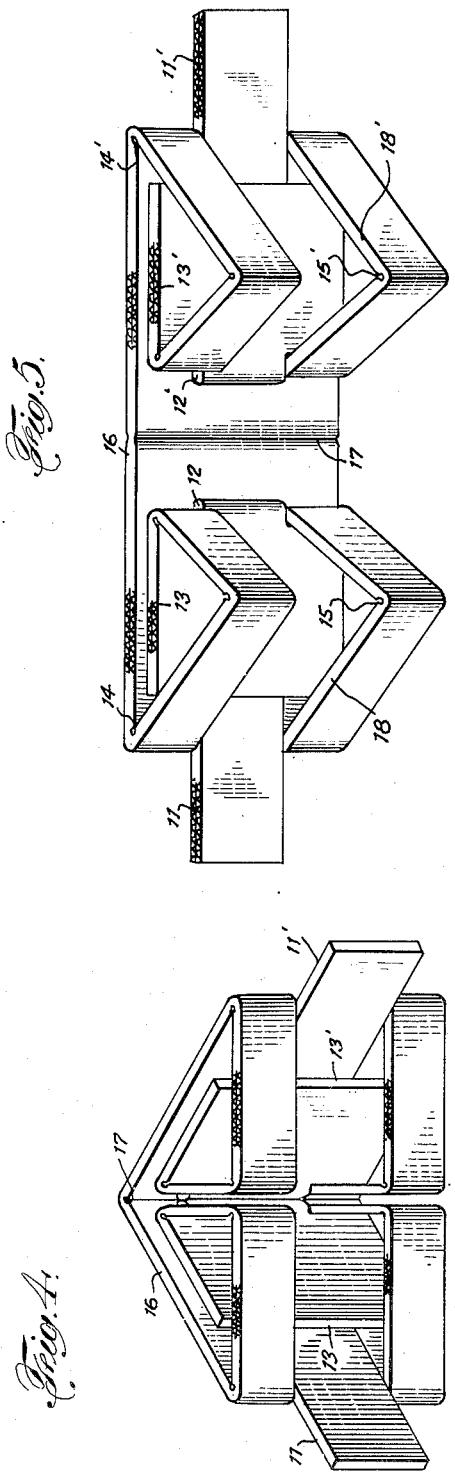
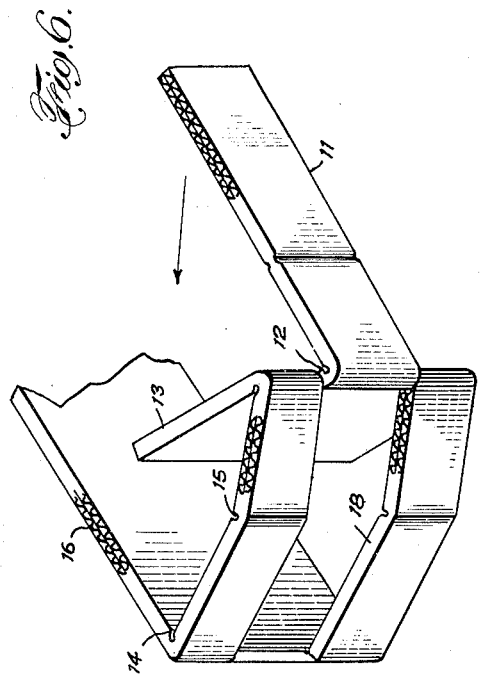
INVENTOR.
James M. Freiberg
BY Oscar L. Spencer
ATTORNEY Patented July 20, 1954

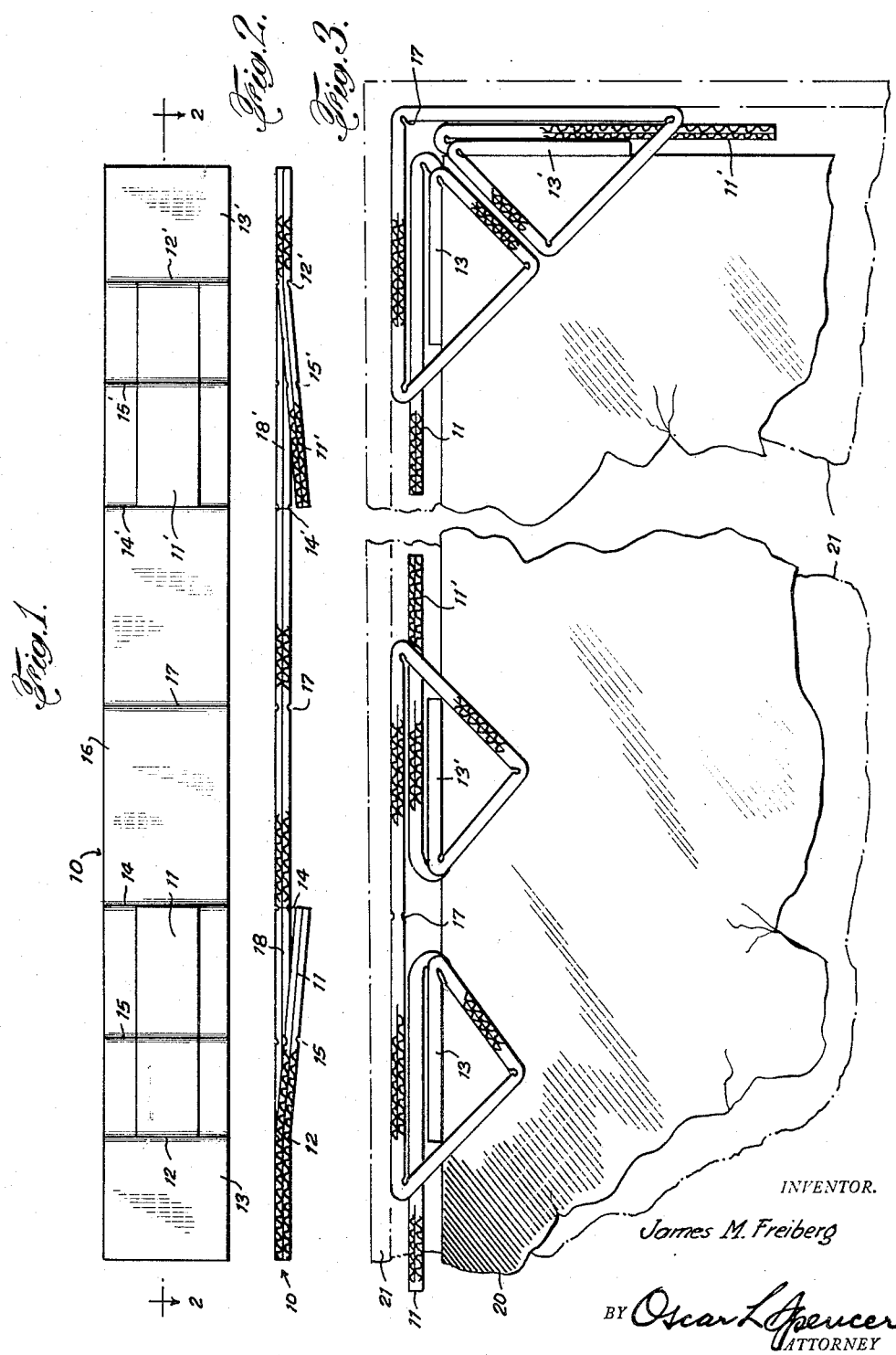

2,684,153

UNITED STATES PATENT OFFICE 2,684,153

SUSPENSION BLOCK FOR PACKING GLASS

James M. Freiberg, New Kensington, Pa., assignor to Pittsburgh Plate Glass Company, Pittsburgh, Pa., a corporation of Pennsylvania Application January 8, 1952, Serial No. 265,389

6 Claims. (Cl. 206—62)

1

This invention relates to a suspension block for packing sheets of glass and the like. More particularly the invention relates to a suspension block which is slotted to receive an edge or corner of the glass sheets and suspend the glass spaced from the walls of the surrounding shipping container.

Sheets of glass commonly are shipped in wood boxes, the glass being protected within the box by wrappings and by packings of bulky corrugated paper board pads or straw. In some cases the corrugated paper board pads have taken the form of supports disposed at the edges or corners of the sheets of the glass to space the glass from the walls of the shipping container. These supports generally have been open to objection because they do not provide a secure suspension of the glass, or because they are bulky to store and pack, or expensive to manufacture, or for other reasons. In some cases the fabrication of the supports has required the use of adhesive or of metal fasteners, both of which are objectionable, because the adhesive may stain or etch the glass, and metal fasteners are likely to scratch or chip the glass.

It is an object of the present invention to provide an improved suspension block which is light in weight, which may be stored and shipped flat, and which may be easily and quickly fabricated from a flat blank immediately prior to use to form a suspension block suitable for application either to a side edge of the glass, or to a corner thereof. It also is an object of the invention to provide an improved suspension block in which the glass is held securely against movement within the shipping container and in which the edges and corners of the glass are spaced from the side walls of the shipping container by multiple thicknesses of corrugated paper board. A further object is to provide a blank which may be easily and quickly folded to form a suspension block suitable for use either on a side edge of the glass, or on a corner. Another object is to provide a suspension block which may be fabricated without the use of adhesive or metal fasteners. Still another object of the invention is to provide economies in the packaging of glass sheets for shipment. Other objects and advantages of the invention will appear hereinafter.

A preferred embodiment of the invention selected for purposes of illustration is shown in the accompanying drawings, wherein:

Figure 1 is a plan view of a blank comprised of a strip of double wall corrugated paper board which has been cut and scored preliminary to folding to form a suspension block;

2

Figure 2 is a longitudinal sectional view through the blank shown in Figure 1 taken substantially on the line 2—2 of Figure 1, the ends of the two tongues cut in the blank being pressed down slightly to disclose the construction;

Figgure 3 is a fragmentary top plan view showing sheets of glass suspended, both along a side edge and at a corner, in a shipping container by suspension blocks formed from a blank as shown in Figures 1 and 2, Figure 3 being drawn to larger scale than the first two figures;

Figure 4 is a perspective view of the suspension block of the present invention as folded for supporting a corner of a thick plate of glass or a stack of glass sheets;

Figure 5 is a perspective view of the suspension block of the present invention as folded for supporting the plate glass or the glass sheets along a side edge; and Figure 6 is a perspective view showing the method of folding the blank of Figures 1 and 2 to form a suspension block.

As can be seen in Figures 1 and 2, the blank from which the suspension block is to be fabricated is a rectangular strip 10 of resilient sheet material, for example double wall corrugated fiber board. Formed in the left end portion of the strip, by two longitudinal cuts and a transverse cut, is a tongue 11, the length of which is several times its width. The hinge line 12 of the tongue 11 extends transversely of the strip and is spaced inwardly from the end of the strip, leaving an uncut terminal section 13. Ordinarily the tongue will be centered transversely of the strip, and the length of the tongue will be approximately twice the length of the uncut terminal section 13.

The strip 10 is scored or creased transversely for folding along the hinge line 12 of the tongue, and at the other end of the tongue as shown at 14, and intermediate the ends of the tongue as shown at 15. Preferably the score line 15 is somewhat closer to the hinge line of the tongue than to its other end, for reasons which will appear hereinafter.

Symmetrically disposed in the right end portion of the strip 10, and aligned with the tongue 11, is a tongue 11'. Transverse score lines designated 12', 14' and 15' in the right end portion of the strip correspond, respectively, to the score lines 12, 14 and 15, and the uncut terminal section at the right end of the strip is designated 13'. The tongues 11—11' terminate short of the center of the strip and are separated from each other by the uncut central portion 16, which has a transverse score line 17 located at the center of the strip.

The blank which is shown in Figures 1 and 2 is ready for folding into a suspension block which may be used to suspend either a side edge or a corner of sheets of glass. The method whereby the suspension block is easily and quickly fabricated from the block will be described. Desirably the actual folding of the blank will be done at the place where the suspension block is to be used, and just prior to the time of use. It will be evident that the blanks shown in Figures 1 and 2 may be compactly stacked and packaged for shipment to the place of use, and for storage.

Referring to Figure 6, it will be seen that in fabricating a suspension block from the blank, the tongue 11 is folded back along its hinge line 12, leaving a longitudinal slot 18 in the end portion of the strip. The end portion of the strip is bent back in the same angular direction as the tongue, along the score lines 12, 14 and 15, and the end of the tongue is passed between the terminal section 13 and the central portion 16, out through the slot formed in the strip by the tongue. The terminal section 13 then is pressed down until it is substantially parallel to the central portion 16 of the strip, being separated therefrom only by the thickness of the tongue 11. The transverse score line 15 preferably is located somewhat closer to the hinge line 12 of the tongue than to the score line 14, the differential being dependent on the thickness of the strip, so as to permit folding the triangular-shaped rib without cramping.

As can be seen in Figure 3, the folding and bending operations just described result in the formation of a slotted, triangular-shaped, transverse rib at the end of the strip. The uncut terminal section 13 forms the bottom of the slot and is backed up by the tongue 11 and the central portion 16, providing a triple thickness of the strip material at the bottom of the slot. The tongue 11 projects out through the slot beyond the rib and serves to hold the end portion of the strip in its bent or folded condition without the necessity of using adhesive or metal fasteners.

The tongue 11' then is bent back along its hinge line 12', and the right end portion of the strip is bent back, but in the opposite angular direction from the folding and bending in the left end portion of the strip, to form a slotted, triangular-shaped, transverse rib at the other end of the strip. The result is the suspension block which is illustrated in Figure 5. Preferably the width of the tongues 11—11' is made equal to the thickness of the plate glass or of the stack of glass sheets to be suspended, so that the side edges of the slots will hold the glass with a slight frictional engagement when the edge of the glass is inserted in the slots.

The block for suspending a corner of the glass sheets is formed merely by bending the block which is shown in Figure 5 approximately 90° at the transverse score line 17 at the center of the strip to bring the two triangular-shaped ribs at the two ends of the strip into juxtaposition, as shown in Figure 4.

Figure 3 shows a sheet of glass 20 suspended within a shipping container 21, the glass being suspended along a side edge by a block as shown in Figure 5, and at a corner by a block as shown in Figure 4. The other edges and corners of the glass will be similarly suspended. It will be evident that the glass 20 is securely suspended in spaced relation to the side walls of the shipping container, and that there is a protective space both above and below the glass.

In Figure 3 a slight spacing is shown between the terminal section 13 and the tongue 11 and the central portion 16 of the strip, so as to disclose the construction more clearly. In use, the tongues will be pressed snugly against the unslotted central portion of the strip by the terminal sections when the suspension block is pressed onto the edge of the glass prior to being placed in the shipping container.

This invention provides a suspension block for shipping sheets of glass and the like which may be quickly fabricated, without the use of adhesive or metal fasteners, from flat strip blanks. The suspension block may be easily applied to the side edges or the corners of the glass, or both, to suspend the glass securely within a shipping container. The suspension block may be used for single sheets of glass, or for a plurality of sheets stacked in face to face relation. It may be used also for mirrors, and for other plate and sheet materials, including metals and plastics, which are to be securely suspended within a shipping container.

It will be understood that the invention herein described may be modified and embodied within the scope of the subjoined claims.

I claim:

1. A suspension block for sheets of glass and the like comprising a strip of resilient sheet material having aligned longitudinal tongues cut in the end portions thereof, the transverse hinge lines of the tongues being spaced inwardly from the ends of the strip with each tongue extending from its hinge line toward, but terminating short of, the longitudinal center of the strip to leave uncut terminal sections and an uncut central portion, the tongues in opposite end portions of the strip being folded 180° in opposite angular directions along their hinge lines to lie against the uncut terminal sections of the strip and provide longitudinal slots in the end portions of the strip, and the end portions of the strip, with the tongues lying against the terminal sections, being symmetrically bent back in the same angular directions as their tongues along transverse lines at the ends of the tongue slots and intermediate the ends of the tongue slots to form a slotted rib at each end of the strip with the uncut terminal sections of the strip lying parallel to the central portion thereof and with the tongues projecting outwardly between the terminal sections and the central portion through the tongue slots beyond the ribs.

2. A suspension block according to claim 1, in which the slotted ribs are triangular in shape.

3. A suspension block according to claim 2, in which the strip also is folded 90° along a transverse line through the longitudinal center of the strip to bring the triangular slotted ribs into juxtaposition and form a suspension block for a corner of the glass providing continuous contact support for the glass from the corner for some distance along each edge thereof.

4. A suspension block for sheets of glass and the like comprising a strip of corrugated paper board, end portions of which are symmetrically bent back in opposite angular directions along several transverse lines to form a rib at each end of the strip, the terminal section of each bent-back end portion of the strip being folded under the rib and lying substantially parallel to the central portion of the strip, spaced therefrom by the thickness of the strip, aligned longitudinal tongues cut in the bent-back portions of the strip, the tongues being hinged at the transverse fold lines of the terminal sections of each bent-back portion and extending the full width of the rib, each tongue being folded back 180° relative to its terminal section in the same angular direction as the bent-back end portion of the strip to lie under the rib, between the terminal section of the strip and the central portion of the strip, and project outwardly beyond the rib through the slot formed in the bent-back end portion by the tongue.

5. A suspension block for sheets of glass and the like comprising a strip of corrugated paper board cut to form two aligned narrow tongues which lie intermediate the side edges of the strip and are connected to the strip along transverse lines spaced from the ends of the strip, each tongue extending from its hinge line toward, but terminating short of, the longitudinal center of the strip, the strip having transverse score lines on which it is adapted to be folded, one score line at each end of each tongue and one score line intermediate the ends of each tongue, each tongue being folded back 180° along the score line at the tongue hinge into surface engagement with the terminal section of the strip, and the end portion of the strip, with the tongue lying against the terminal section, being bent back in the same angular direction along all three score lines to form a transverse, triangular-shaped rib with the tongue lying between the central portion and the terminal section of the strip and projecting through the slot formed by the tongue, beyond the triangular rib.

6. A suspension block according to claim 5, in which the score line intermediate the ends of the tongue is spaced closer to the hinge of the tongue than to the free end of the tongue.

References Cited in the file of this patent
UNITED STATES PATENTS

| Number | Name | Date |
| --- | --- | --- |
| 1,913,655 | Benoit | June 13, 1933 |
| 2,490,186 | Yarman | Dec. 6, 1949 |
| 2,507,929 | Pennebaker | May 16, 1950 |
| 2,603,349 | Van Antwerpen | July 15, 1952 |